(12) United States Patent
Benz et al.

(10) Patent No.: US 9,074,656 B2
(45) Date of Patent: Jul. 7, 2015

(54) DRIVE TRAIN OF A MOTOR VEHICLE HAVING AN INTERNAL COMBUSTION ENGINE AND A STARTER GENERATOR

(71) Applicant: Dr. Ing. h.c. F. Porsche Aktiengesellschaft, Stuttgart (DE)

(72) Inventors: Wolfgang Benz, Leinfelden-Echterdingen (DE); Stephan Mueller, Leonberg (DE); Sven Gohl, Karlsruhe (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 51 days.

(21) Appl. No.: 14/050,686

(22) Filed: Oct. 10, 2013

(65) Prior Publication Data

US 2014/0102253 A1 Apr. 17, 2014

(30) Foreign Application Priority Data

Oct. 16, 2012 (DE) .......................... 10 2012 109 852

(51) Int. Cl.
| | |
|---|---|
| *B60K 17/28* | (2006.01) |
| *B60K 25/00* | (2006.01) |
| *F16H 7/02* | (2006.01) |
| *F02N 11/00* | (2006.01) |
| *F02N 11/04* | (2006.01) |
| *F02N 15/02* | (2006.01) |
| *F02N 15/08* | (2006.01) |

(Continued)

(52) U.S. Cl.
CPC ................. *F16H 7/02* (2013.01); *Y10T 74/134* (2015.01); *F02N 11/00* (2013.01); *F02N 11/003* (2013.01); *F02N 11/04* (2013.01); *F02N 11/0814* (2013.01); *F02N 15/022* (2013.01);

(Continued)

(58) Field of Classification Search
CPC .. B60K 25/02; B60K 25/00; B60K 2025/005; B60K 6/383; F02B 67/06; F02B 11/003
USPC .......... 74/664; 180/53.8, 65.21, 165; 477/3, 5
See application file for complete search history.

(56) References Cited

U.S. PATENT DOCUMENTS

| 1,585,831 | A | | 3/1924 | Bradford |
| 6,048,288 | A | * | 4/2000 | Tsujii et al. ....................... 477/5 |

(Continued)

FOREIGN PATENT DOCUMENTS

| DE | 361 166 | 10/1922 |
| DE | 198 54 948 | 5/2000 |

(Continued)

OTHER PUBLICATIONS

German Search Report of May 22, 2013.

*Primary Examiner* — David M Fenstermacher
*Assistant Examiner* — Jake Cook
(74) *Attorney, Agent, or Firm* — Gerald E. Hespos; Michael J. Porco; Matthew T. Hespos

(57) ABSTRACT

A drive train (1) of a motor vehicle has an internal combustion engine (2) with a crankshaft (6). A transmission (3) is connected downstream of the internal combustion engine (2) to drive at least one axle (5) of the motor vehicle. A starter generator (23) is assigned to the internal combustion engine (2). The starter generator (23) is attached to the crankshaft (6) by two separate drive trains (13, 22; 24, 25). One (24, 25) of the drive trains (13, 22; 24; 25) has a shiftable clutch (29) and the other (13, 22) of the drive trains (13, 22; 24, 25) has a shiftable clutch (32) or a freewheel (11) that is active during a starter mode of the starter generator (23). The drive train ensures an optimum start capability of the cold internal combustion engine and additionally permits electric boosting of the internal combustion engine.

5 Claims, 1 Drawing Sheet

(51) Int. Cl.
    *F02B 67/06*     (2006.01)
    *B60K 6/485*     (2007.10)
    *F02N 11/08*     (2006.01)

(52) U.S. Cl.
    CPC .............. *F02N15/023* (2013.01); *F02N 15/08* (2013.01); *F02N 2300/2002* (2013.01); *F02B 67/06* (2013.01); *B60K 6/485* (2013.01)

(56) References Cited

U.S. PATENT DOCUMENTS 7,867,119 B2 *   1/2011   Brunetiere ..................... 474/84
8,216,113 B2 *   7/2012   Parsons ......................... 477/167
2008/0149405 A1 *   6/2008   Hladun et al. ................ 180/53.8
2009/0255741 A1 *   10/2009   Major et al. ................ 180/65.22
2009/0314559 A1 *   12/2009   Palitto ........................ 180/65.22
2010/0065001 A1 *   3/2010   Spicer et al. ............. 123/179.28
2010/0236847 A1 *   9/2010   Yang et al. ................ 180/65.22
2012/0068651 A1   3/2012   Stief

FOREIGN PATENT DOCUMENTS

| | | |
|---|---|---|
| DE | 2 241 747 | 10/2010 |
| DE | 10 2009 033 633 | 1/2011 |
| DE | 10 2010 019 047 | 11/2011 |
| EP | 1 079 0085 | 2/2001 |
| JP | 58-116229 | 7/1983 |

* cited by examiner

DRIVE TRAIN OF A MOTOR VEHICLE HAVING AN INTERNAL COMBUSTION ENGINE AND A STARTER GENERATOR

CROSS REFERENCE TO RELATED APPLICATION

This application claims priority under 35 USC 119 to German Patent Appl. No. 10 2012 109 852.2 filed on Oct. 16, 2012, the entire disclosure of which is incorporated herein by reference.

BACKGROUND

1. Field of the Invention

The invention relates to a drive train of a motor vehicle, having an internal combustion engine with a crankshaft, a transmission connected downstream of the internal combustion engine to drive at least one axle of the motor vehicle, and a starter generator assigned to the internal combustion engine.

2. Description of the Related Art

An electrically operated starter generator operates as a motor to start an internal combustion engine. The starter generator also can drive an axle of the motor vehicle together with the internal combustion engine during operation of the drive train as a mild hybrid. In the generator mode, the starter generator is driven by the internal combustion engine and/or via the axle of the motor vehicle.

DE 10 2009 033 633 A1 discloses a drive train with a belt drive that has a belt that is guided over a pulley of the starter generator and functions to drive the generator. The generator can be operated temporarily as a starter motor and is coupled via a freewheel to the generator pulley or an engine crankshaft belt pulley. The freewheel allows the generator to overrun the generator pulley or the crankshaft during the motor mode. As a result, the power flow via the belt drive and the belt drive loading induced by the inherent inertia of the generator can be reduced during an engine start phase, and in phases with a high angular velocity rise of the crankshaft of the internal combustion engine.

JP 58-116229 A describes the drive train of an oil pump of an internal combustion engine. The oil pump is attached either via a belt drive to the internal combustion engine or via a belt drive to an electric machine. To this end, a shiftable clutch is provided between the internal combustion engine and the belt drive that is assigned to the internal combustion engine.

EP 1 079 085 A2 discloses the optional use of an electric machine as starter motor or as generator. The electric machine is attached by a shiftable clutch to a crankshaft of the internal combustion engine. The electric machine also is attached via an auxiliary shaft that is assigned a further shiftable clutch to a transmission that is connected downstream of the internal combustion engine. As a result, when the clutch that is assigned to the auxiliary shaft is closed, the electric machine can be operated in the generator mode via the transmission that is connected downstream of the internal combustion engine.

It is an object of the invention to provide a drive train that ensures an optimum start capability in the case of a cold internal combustion engine and while also providing the possibility to boost the internal combustion engine electrically.

SUMMARY OF THE INVENTION

The invention relates to a drive arrangement with a starter generator that is attached to a crankshaft by first and second separate drive trains. The first drive train has a shiftable clutch and the second drive train has a shiftable clutch or a freewheel that is active during the starter mode of the starter generator. The provision of the two separate drive trains of the starter generator enables the different operating states of the internal combustion engine and/or the drive train of the motor vehicle to be controlled in an optimum manner by attachment of one or the other of the separate drive trains.

The clutch of one separate drive train is closed to achieve a favorable cold start of the internal combustion engine in the drive train via a particularly favorable transmission ratio that is relatively high. The transmission ratio can be realized in a simple way by a transmission that preferably is configured as a flexible drive mechanism, such as a belt drive.

The other drive train of the starter generator makes it possible to drive auxiliary units of the internal combustion engine independently of the internal combustion engine. The auxiliary units are, for example, a coolant pump and/or a mechanical refrigerant compressor and can be operated by the starter generator before the internal combustion engine is started.

If the first drive train has the shiftable clutch and the second drive train has the freewheel that is active during the starter mode of the starter generator, the internal combustion engine can be started only when the clutch of the first drive train is closed. In this case, the freewheel prevents the starter generator from introducing a starting moment into the crankshaft of the internal combustion engine via the second drive train. In this variant, the freewheel is overrun as the rotational speed of the started internal combustion engine increases. As a result, the crankshaft of the internal combustion engine drives the auxiliary units.

In another variant, both separate drive trains have a shiftable clutch, and there is no freewheel. Thus both clutches are not closed at any time, since it is preferably to be assumed that the two separate drive trains have different transmission ratios.

The auxiliary units preferably are driven via the starter generator by means of a transmission that is configured as a belt drive. The design of belt drives allows the transmissions to be structurally simple and with a desired transmission ratio.

The use of clutches that are assigned to the separate drive trains permits optimization of the start of the internal combustion engine. Thus the separate drive train of the starter generator that interacts with the auxiliary units interacts with the crankshaft of the internal combustion engine with a lower transmission ratio than the other separate drive train. Accordingly, the other separate drive train is activated during cold starting. Restarting the internal combustion engine, that is to say warm starting, preferably takes place via the other separate drive train, which therefore has the lower transmission ratio and is assigned to the auxiliary units. Shifting of the drive trains can be brought about by simple shifting of the two clutches.

The drive train of the invention makes boosting possible by operating the starter generator while driving with the internal combustion engine. The starter generator therefore is active as a motor and, when the freewheel in the second drive train is used, introduces an additional moment into the crankshaft via the second drive train at least when the clutch of the second drive train is closed. If two shiftable clutches are used in the two separate drive trains, the additional moment can be introduced into the crankshaft either via either drive train.

The configuration of the drive train enables an increased power output of the internal combustion engine and therefore is particularly advantageous in the sport mode. The auxiliary units are not capable of being driven in the sport mode because the two clutches are open. Accordingly, both the starter generator and the auxiliary units are decoupled from the internal combustion engine. As a result, the internal combustion engine does not have to generate the power output for driving the auxiliary units and the full power output of the internal combustion engine is available for moving the vehicle.

The drive train requires only a single electric machine in the manner of a starter generator that can be operated as a motor or as a generator. The auxiliary units can be driven with two transmission ratios, namely, one transmission ratio when driven by the starter generator, and the other transmission ratio when driven via the crankshaft of the internal combustion engine.

Further features of the invention will become apparent from the drawings of exemplary embodiments and the detailed description, without being restricted hereto.

DETAILED DESCRIPTION OF THE PREFERRED EMBODIMENTS

Figure 1:
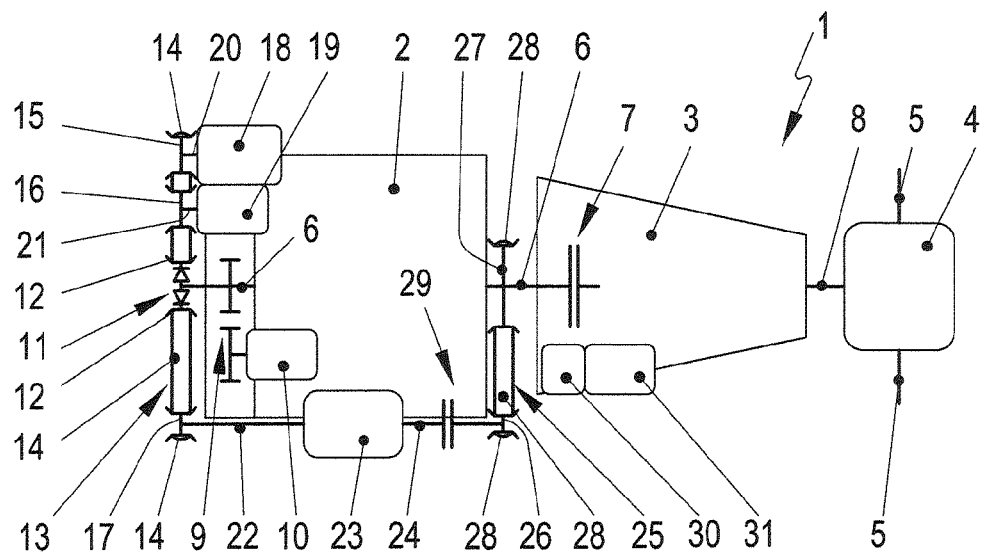
FIG. 1 is a schematic illustration of a first embodiment of the drive train of the invention.

A drive train 1 of a motor vehicle in accordance with a first embodiment of the invention is identified by the numeral 1 in FIG. 1. The drive train 1 has an internal combustion engine 2, a transmission 3 connected downstream of the internal combustion engine 2 and a differential 4 connected downstream of said transmission 3 to drive an axle 5 of the motor vehicle. A crankshaft 6 of the internal combustion engine 2 is connected via a shiftable clutch 7 to a transmission shaft 8 that interacts with the differential 4.

An internal transmission 9 is provided on the side of the internal combustion engine 2 that faces away from the transmission 3. The internal transmission 9 is assigned to the crankshaft 6 to drive an engine oil pump 10 of the internal combustion engine 2. The crankshaft 6 is guided out of the side of the internal combustion engine 2 that faces away from the transmission 3 and receives a belt pulley 12 via a freewheel 11. The freewheel 11 is designed to be overridden when the internal combustion engine 2 is in operation and the crankshaft 6 is rotating relatively quickly so that the belt pulley 12 is driven via the crankshaft 6.

The belt pulley 12 is a constituent part of a belt drive 13 that has a belt 14 and at least three further belt pulleys 15, 16, 17 about which the belt 12 is wrapped. Auxiliary units, including a mechanical refrigerant compressor 18 and a coolant pump 19, are assigned to the internal combustion engine 2. The auxiliary units are mounted on the side of the internal combustion engine 2 that faces away from the transmission 3. The belt pulley 15 is connected fixedly to a shaft 20 of the coolant compressor 18 and the belt pulley 16 is connected fixedly to a shaft 21 of the coolant pump 19 so as to rotate with it.

The belt pulley 17 is connected fixedly to a shaft 22 of a starter generator 23 so as to rotate with it. A further shaft 24 is connected to the side of the starter generator 23 opposite the shaft 22. Accordingly, the starter generator 23 has two input or output shafts 22, 24, depending on whether the starter generator 23 is driven or is the driver.

The shafts 20, 21, 22 and 24 are mounted parallel to the bearing axis of the crankshaft 6 in a crankcase/cylinder head of the internal combustion engine 2.

A further belt drive 25 is arranged between the internal combustion engine 2 and both the transmission 3 and the clutch 7. The belt drive 25 has a belt pulley 26 with a relatively small diameter, a belt pulley 27 with a considerably greater diameter, and a belt 28. The belt pulley 26 is fixed to and rotates with the shaft 24, while the belt pulley 27 is fixed to and rotates with the crankshaft 6. The shaft 24 has a shiftable clutch 29 between the starter generator 23 and the belt pulley 26.

The starter generator 23 that is operated in the motor mode drives the belt drive 13, which in turn drives the auxiliary units, such as the refrigerant processor 18 and the coolant pump 19. The auxiliary units therefore can be driven even when the internal combustion engine 2 is at a standstill.

To start the internal combustion engine 2, it merely is necessary to operate the starter generator 23 in the motor mode and to close the clutch 29. A very high moment for starting the internal combustion engine 2 therefore is introduced into the crankshaft 6 by the belt drive 25 on account of the relatively high transmission ratio. The high moment is particularly advantageous for starting the internal combustion engine 2 in a cold start.

When the internal combustion engine 2 is started and the clutch 29 is open, the rotational speed of the crankshaft 6 increases. As a result, the freewheel is overridden and, as a consequence, a torque is introduced into the belt pulley 12. Therefore, the belt pulley 12 drives the belt drive 13 and the auxiliary units.

The diameter of the belt pulley 17 that interacts with the starter generator 23 via the shaft 22 is smaller than the diameter of the belt pulley 12 that interacts via the freewheel 11 with the crankshaft 6. Accordingly, two different transmission ratios are possible in relation to the drive of the refrigerant processor 18 and the coolant pump 19. The drive via the starter generator 23 therefore has a different transmission ratio than the drive via the crankshaft 6 when the internal combustion engine 2 is running.

A boost function takes place when the clutch 29 is closed in the motor mode of the starter generator 23, and the starter generator 23 introduces an additional torque to the torque of the internal combustion engine 2 into the crankshaft 6.

Two separate drive trains interact with the starter generator 23, namely a first drive train formed by the belt drive 13 and the shaft 22, and a second drive train formed by the shaft 24 and the belt drive 25.

An electric machine 30 and a hydraulic pump 31 that can be driven by the electric machine 30 are assigned to the transmission 3. The electrically driven hydraulic pump 31 enables shifting of the transmission 3 even when the internal combustion engine 2 is stopped.

Figure 2:
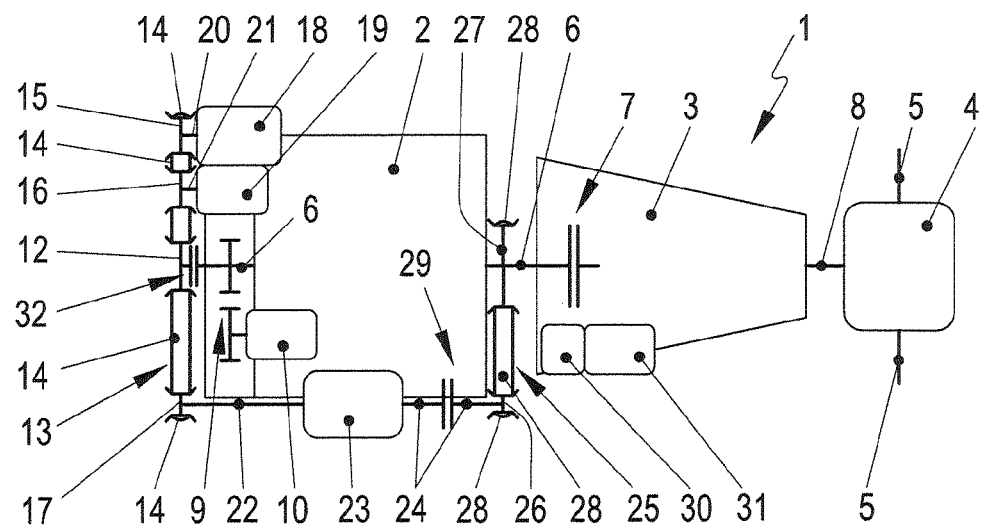
FIG. 2 is a schematic illustration of a second embodiment of the drive train of the invention.

The embodiment of FIG. 2 differs from FIG. 1 only in that the crankshaft 6 is not connected to the belt pulley 12 via the freewheel 11. Rather, a shiftable clutch 32 is arranged between the crankshaft 6 and the belt pulley 12. Parts that coincide with the embodiment of FIG. 1 are denoted by the same reference numbers.

The replacement of the freewheel 11 by the shiftable clutch 32 in the embodiment of FIG. 2 enables the internal combustion engine 2 to be started via the belt drive 25, as described with respect to FIG. 1, or alternatively by the belt drive 13 with a different and lower transmission ratio. In the first-mentioned start procedure, the clutch 29 is closed and the clutch 32 is open. In the last-mentioned start procedure the clutch 29 is open and the clutch 32 is closed. The last-mentioned start procedure is advantageous in the case of a warm start of the internal combustion engine 2.

The variant with the clutch 32 enables the refrigerant processor 18 and the coolant pump 19 to be driven when the clutch 32 is open and when the internal combustion engine 2 is at a standstill. However, the auxiliary units 18, 19 are driven by the internal combustion engine 2 via the crankshaft 6 when the clutch 32 is closed and the internal combustion engine 2 is started. The variant of FIG. 2 also makes the boost function possible, by either one of the clutches 29 or 32 being closed. The different transmission ratios of the belt drives 13 and 25 ensure that both clutches 29, 32 are not closed at the same time.

This also applies to the operation of the starter generator 23 in the generator mode.

The variant with the two clutches 29, 32 also enables an increase in the power output of the differential 4 by neither the auxiliary units being driven by the internal combustion engine 2 nor the starter generator 23 being attached when both clutches 29, 32 are open. An increased power output of the internal combustion engine 2 therefore is available briefly.

Figure 3:
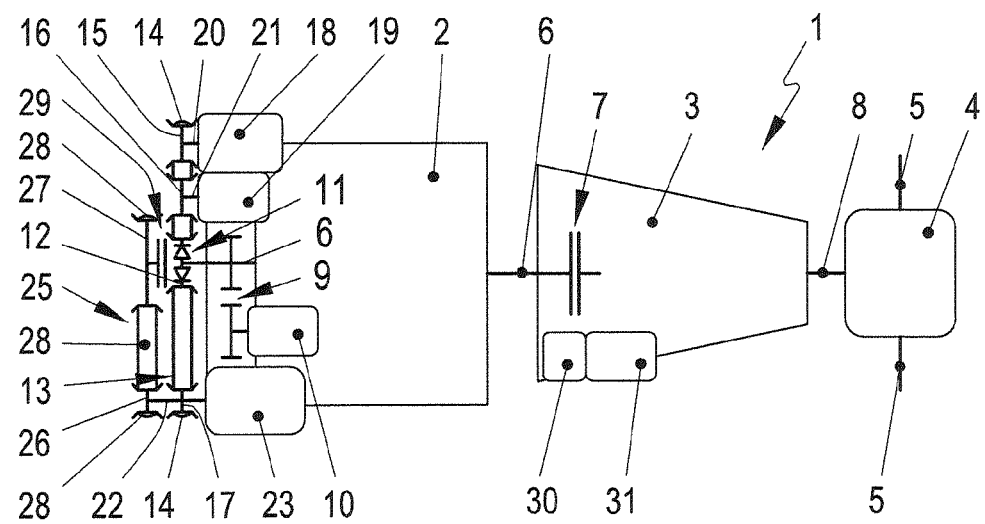
FIG. 3 is a schematic illustration of a third embodiment of the drive train of the invention.

The embodiment of FIG. 3 differs from FIG. 1 in that the two belt drives 13, 25 are arranged on the side of the internal combustion engine 2 that faces away from the transmission 3. This variant is advantageous when the spatial conditions make it necessary that the belt drive 25 is not arranged between the internal combustion engine 2 and the transmission 3.

Elements of the embodiment of FIG. 3 that coincide with the embodiment of FIG. 1 are denoted by the same reference numbers.

In the embodiment of FIG. 3, the starter generator 23 has only one output shaft, namely the output shaft 22. The belt pulley 14 of the belt drive 13 is fixed to and rotates with the output shaft 22. The belt pulley 26 also is connected to the shaft 22 at a spacing from the belt pulley 14, and on that side of the belt pulley 14 that faces away from the starter generator 23. The crankshaft 6 is extended beyond the freewheel 11 that is assigned to the belt drive 13 and the belt pulley 12, and is connected to the belt pulley 27 via the shiftable clutch 29.

In the embodiment of FIG. 3, as in the embodiment of FIG. 1, the auxiliary units are driven independently by the starter generator 23 via the belt drive 13 when the internal combustion engine 2 is at a standstill, and, after the clutch 29 is closed, the internal combustion engine 2 is started in the motor mode of the starter generator 23. In accordance with the exemplary embodiment in FIG. 1, the generator mode and the boost function are realized in the embodiment of FIG. 3, as in the embodiment of FIG. 1. Reference is made to this extent to the comments made above with respect to FIG. 3.

The embodiments of FIGS. 1 and 3 therefore require only one element which is to be shifted actively, namely the clutch 29, whereas the embodiment of FIG. 2 requires two elements that are to be shifted actively, namely the clutches 29 and 32.

What is claimed is:

1. A drive train of a motor vehicle, having an internal combustion engine with a crankshaft, a transmission connected downstream of said internal combustion engine to drive at least one axle of the motor vehicle, and a starter generator assigned to the internal combustion engine, the starter generator having first and second output shafts, the first output shaft being attached to the crankshaft by a first drive train having a first belt drive and a shiftable clutch and being arranged between the internal combustion engine and the transmission, the first drive train being active during a starter mode of the starter generator, the second output shaft of the starter generator being attached to the crankshaft by a second drive train having a second belt drive and a second shiftable clutch or a freewheel, the second output shaft being on a side of the internal combustion engine that faces away from the transmission.

2. The drive train of claim 1, further comprising auxiliary units assigned to the internal combustion engine, the auxiliary units being attached to the second drive train.

3. The drive train of claim 2, wherein the auxiliary units can be driven by the first belt drive.

4. The drive train of claim 1, wherein the second clutch or the freewheel is arranged in the second drive train between the crankshaft of the internal combustion engine and a belt pulley of the second belt drive for driving the auxiliary units, and the second clutch is arranged in the second drive train between the starter generator and a belt pulley of the second belt drive for driving the crankshaft.

5. A drive train of a motor vehicle, comprising:
an internal combustion engine with a crankshaft;
a transmission connected downstream of the internal combustion engine to drive at least one axle of the motor vehicle;
a starter generator assigned to the internal combustion engine, the starter generator having an output shaft arranged on a side of the internal combustion engine that faces away from the transmission;
a first belt pulley connected to the crankshaft of the internal combustion engine via a freewheel;
a first belt drive connecting the output shaft of the starter generator to the crankshaft of the internal combustion engine via the first belt pulley and the freewheel;
a second belt pulley connected to the crankshaft of the internal combustion engine via a clutch; and
a second belt drive connecting the output shaft of the starter generator to the crankshaft of the internal combustion engine via the second belt pulley and the clutch, wherein
the clutch is disposed so that the freewheel is upstream of the clutch in relation to an output side of the crankshaft, and the first belt pulley drives auxiliary units and has a transmission ratio that is lower than a transmission ratio of the second belt pulley.

* * * * *